United States Patent Office 3,766,180
Patented Oct. 16, 1973

3,766,180
3-HETEROCYCLICAMINO-4-CHLORO-
1,2,5-THIADIAZOLES
Leonard M. Weinstock, Belle Mead, Roger J. Tull,
Metuchen, and Dennis M. Mulvey, Whitehouse Station,
N.J., assignors to Charles E. Frosst & Co., Kirkland,
Quebec, Canada
No Drawing. Original application Apr. 21, 1969, Ser. No.
818,474, now Patent No. 3,657,237, dated Apr. 18,
1972. Divided and this application Aug. 16, 1971, Ser.
No. 172,230
Int. Cl. C07d 87/46
U.S. Cl. 260—247.1                              5 Claims

ABSTRACT OF THE DISCLOSURE

Preparation of S-3-X-4-(3-substituted amino-2-hydroxypropoxy) - 1,2,5 - thiadiazole beta adrenergic blocking agents using as starting material an optically active alkamine in the sinister configuration, or a derivative of said alkamine, which is reacted with a 3-X-4-chloro (or RO— where R is hydrogen or an alkali metal)-1,2,5-thiadiazole. Novel 3-morpholino-4-chloro (or RO—)-1,2,5-thiadiazoles and novel alkamines and their preparation also are described.

This application is a division of our copending patent application, Ser. No. 818,474, filed Apr. 21, 1969, now Pat. 3,657,237, issued Apr. 18, 1972.

This invention is concerned with a novel and commercially feasible method for preparing the biologically active, S-enantiomer of a 3-X-4-(3-substituted amino-2-hydroxypropoxy)-1,2,5-thiadiazole product. Substantially all of the biological activity of these products resides in the S-enantiomer which was obtained by other workers by the resolution of the racemic product or by the resolution of intermediates employed in their synthesis. These prior methods offer several disadvantages, principally the need to use cyanogen for the synthesis of the intermediate 3-chloro-4-hydroxy-1,2,5-thiadiazole, an important intermediate, as well as the need to resolve the 3-X-4-(3-substituted amino-2-hydroxypropoxy)-1,2,5-thiadiazole derivative thereof. It s well known that resolution procedures are uneconomical as they provide low yields of active material because half of the yield of racemic product formed is of no value, and at least some of the desired isomer is not recoverable by feasible large scale procedures.

This invention therefore is concerned principally with the preparation of optically active 3-X-4-(3-substituted amino-2-hydroxypropoxy)-1,2,5-thiadiazoles utilizing in the synthesis thereof derivatives of optically active carbohydrates thus avoiding all of the difficulties encountered by other workers in the resolution of the end product itself or the need to resolve racemic compounds at any stage of the synthesis of the active end products, or the need to employ cyanogen in the syntheses of the thiadiazole starting material.

The invention also is concerned with a novel method for preparing 3-X-4-chloro-1,2,5-thiadiazole and 3-X-4-hydroxy-1,2,5-thiadiazole, as well as a novel method for preparing the optically active $R^1$-alkamines.

According to the principal process of this invention a 1,2,5-thiadiazole, structure I, is reacted with an optically active alkamine of the sinister (S) configuration, structure II, to provide product III in the sinister configuration. Either structure I compound or structure II compound contains a reactive hydroxyl group or an alkali metal salt thereof; thus the reaction can be illustrated by the following scheme:

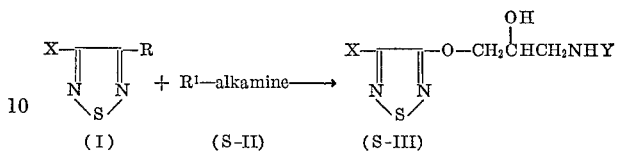

wherein either R or $R^1$ is the reactive hydroxyl group or an alkali metal metal salt thereof wherein the alkali metal preferably is sodium or potassium. When $R^1$ is HO— or (alkali metal —O—) then R is chloro; when R is OH or a salt thereof, when $R^1$ is the sulfonate or epoxide derivative of the alkamine. X in the above structures represents chloro, lower alkyl having 1 to 3 carbon atoms, lower alkoxy having from 1 to 3 carbon atoms, phenyl, benzyl, morpholino, piperidyl, hydroxy-piperidyl, and N-lower alkyl-piperazinyl; and Y is a straight or branched chain lower alkyl having from 1 to 5 carbon atoms which is optionally hydroxy substituted.

When in the foregoing reaction scheme R in the thiadiazole I is chloro then the $R^1$-alkamine advantageously is selected from (A) S-1-(Y-amino)-2,3-dihydroxypropane, or a derivative thereof such as (B) an (S)-oxazolidine of the structure

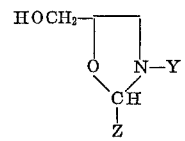

wherein Y has the meaning assigned above and Z is the residue of any known aldehyde; any one of which can be employed in the synthesis of the oxazolidine, or (C) S-2,2'-methylene bis-3-(Y-amino)-1,2-propanediol.

When R in compound I is chloro and $R^1$ in compound II represents the reactive hydroxyl group, the optically active product, S-III, is prepared by the reaction of the thiadiazole I and the S-alkamine, S-II, in the presence of a strong base. The reaction preferably is carried out at ambient temperature although the reaction mixture either can be heated up to reflux temperature if desired, or cooled to 0° C. A solvent for the reactants is desirable and any conventional solvent can be employed for this purpose; suitable ones being polar aprotic solvents such as dimethylformamide (DMF), dimethyl sulfoxide (DMSO), tetrahydrofuran (THF), hexamethylphosphoramide (HMP); lower alkanols and the like. The readily available and relatively inexpensive tert-butanol has been found to be a quite suitable, general purpose solvent for these intermediates. Strong bases that are recommended for use in the reaction are alkali metal alkoxides or alkali metal hydroxides preferably the sodium or potassium alkoxides or hydroxides, or sodium hydride. When product S-III in the form of the free base is obtained as an oil, crystalline material can be prepared by forming the salt by known methods. Suitable salts are those formed with mineral acids or organic acids such as for example the hydrochloride salt, the sulfate, the hydrogen maleate salt or other desired mineral or organic acid salt.

The thiadiazole starting substance I wherein R is chloro and the 3-position substituent is morpholino, a piperidyl or a piperazinyl, is prepared by the reaction of 3,4-dichloro-1,2,5-thiadiazole with morpholine, or the selected piperidine or piperazine, preferably with heating from about 80° C. to about 150° C., optimally at about 100° C. to provide 3-morpholino-(piperidyl- or piperazinyl)-4-chloro-1,2,5-thiadiazole. While morpholine, piperidine, or piperazine can be employed in excess for their solvent properties, other conventional organic solvents can be employed for this purpose.

This novel method for the preparation of 3-morpholino-(piperidyl- or piperazinyl)-4-chloro-1,2,5-thiadiazole provides the desired compound in very high yield.

Preparation of S-3-X-4-[3-(Y-amino)-2-hydroxypropoxy]-1,2,5-thiadiazole via 3-X-4-chloro-1,2,5-thiadiazole Step A: Preparation of 3-morpholino-4-chloro-1,2,5-thiadiazole.—3,4 - dichloro-1,2,5-thiadiazole (100.0 g.; 0.645 mole) is added dropwise over a 30-minute period at 105–110° C. to morpholine (224 ml.; 2.58 mole). After the addition, the mixture is stirred 2 hours at 105–110° C., then cooled to 15° C. and quenched with water (250 ml.). This mixture then is made acidic with concentrated hydrochloric acid (250 ml.) whereupon an insoluble oil soon crystallizes to a heavy solid mass. After crystallization is complete the solid is filtered and washed with water and then dried at 35° C. in vacuo yielding 125.5 g. (95%) of 3-morpholino-4- chloro-1,2,5-thiadiazole, M.P. 43–45° C.

By replacing morpholine in the above reaction with an equivalent quantity of N-methylpiperazine, piperidine and 4-hydroxypiperidine and then following substantially the same method there is obtained, respectively, 3-(4-methylpiperazinyl)-4-chloro-1,2,5-thiadiazole,
3-piperidyl-4-chloro-1,2,5-thiadiazole, and
3-(4-hydroxypiperidyl)-4-chloro-1,2,5-thiadiazole.

Step B: Preparation of S(—)-glycolamine.—A mixture of tert-butylamine (37.44 g.; 0.513 mole), methanol (150 ml.) and 5% palladium-on-carbon (1.0 g.) is shaken in a hydrogenation bomb under three atmospheres hydrogen pressure. A solution of D-glyceraldehyde (15 g.) in methanol (60 ml.) is added over a one hour period during hydrogenation. After the addition, the mixture is shaken for an additional 15 hours. The catalyst is removed by filtration and the solvent evaporated in vacuo yielding S(—)-1,2-dihydroxy - 3 - tert-butylaminopropane [S-(—)-glycolamine] in the form of an oil which is crystallized by trituration with ether to give 11.0 g. (45%) yield of product, M.P. 80–82° C., $[\alpha]_D$ —30.1 (1 N aqueous HCl).

Step C: Preparation of S(—)-3-morpholino-4-(3-tert-butylamino-2-hydroxypropoxy)-1,2,5-thiadiazole and its hydrogen maleate salt.—A mixture of 3-morpholino-4-chloro-1,2,5-thiadiazole (20.57 g.) and S(—)-glycolamine (14.72 g.) in anhydrous tert-butanol (50 ml.) is heated to reflux under a nitrogen atmosphere. A solution of potassium tert-butoxide in tert-butanol (100 ml. of 1 M solution or equivalent) is added in 10 ml. portions and the mixture refluxed 10 minutes between additions. After the last addition the mixture is refluxed an additional 10 minutes, then cooled to 60° C., and treated with 6 N hydrochloric acid (50 ml.) in a thin stream while maintaining good cooling. An additional 50 ml. of water is added and the tert-butanol is evaporated in vacuo leaving an oil-water residue. This residue is extracted with one 50 ml. portion and one 20 ml. portion of methylene chloride and the combined organic layers are backwashed with two 50 ml. portions of 4 N hydrochloric acid. The combined acid layers are made alkaline with excess potassium carbonate (approximately 80 g.) and extracted with two 50 ml. portions of ether. The combined ether layers are washed with two 20 ml. portions of water, dried over magnesium sulfate and evaporated in vacuo to give 13.7 g. of S(—)-3-morpholino-4-(3-tert-butylamino-2-hydroxypropoxy)-1,2,5-thiadiazole in the form of an oil.

This oil is dissolved in 50 ml. of tetrahydrofuran, treated with charcoal (1.5 g.), filtered, and the cake washed with 20 ml. of tetrahydrofuran. To this solution is added maleic acid [5.0 g.; 1 mole equivalent per mole of S(—)-3-morpholino-4-(3 - tert-butylamino-2-hydroxypropoxy)-1,2,5-thiadiazole] dissolved in tetrahydrofuran (25 ml.). The mixture then is seeded and aged one hour at 25° C. The crystallized hydrogen maleate salt is separated by filtration, washed with tetrahydrofuran and dried at 50° C. in vacuo to give 7.3 g. of S(—)-3-morpholino-4-(3-tert - butylamino - 2 - hydroxypropoxy)-1,2,5-thiadiazole hydrogen maleate, M.P. 195–198° C. (sample inserted at 190° C. and heated at rate of 3°/min.). $[\alpha]_{405}$ —12° [c.=4, 1 N HCl], equivalent weight 429–431 (titrated with base), calculated 432.

By employing quantities of the following reaction pairs (1) 3-morpholino-4-chloro-1,2,5-thiadiazole and S-1,2-dihydroxy-3-isopropylaminopropane,
(2) 3-(4-methylpiperazinyl)-4-chloro-1,2,5-thiadiazole and S(—)-glylcolamine,
(3) 3-piperidyl-4-chloro-1,2,5-thiadiazole and S-1,2-dihydroxy-3-isopropylaminopropane,
(4) 3-piperidyl-4-chloro-1,2,5-thiadiazole and S-(—)-glycolamine, and
(5) 3-(4-hydroxypiperidyl)-4-chloro-1,2,5-thiadiazole and S(—)-glycolamine equivalent to the quantity used in Step C and following substantially the same procedure described in Step C, there is obtained, respectively, (1) S-3-morpholino-4-(3-isopropylamino-2-hydroxypropoxy)-1,2,5-thiadiazole and its hydrogen maleate salt,
(2) S-3-(4-methylpiperazinyl)-4-(3-tert-butylamino-2-hydroxypropoxy)-1,2,5-thiadiazole and its hydrogen maleate salt,
(3) S-3-piperidyl-4-(3-isopropylamino-2-hydroxypropoxy)-1,2,5-thiadiazole and its hydrogen maleate salt,
(4) S-3-piperidyl-4-(3-tert-butylamino-2-hydroxypropoxy)-1,2,5-thiadiazole and its hydrogen maleate salt, and
(5) S-3-(4-hydroxypiperidyl)-4-(3-tert-butylamino-2-hydroxypropoxy)-1,2,5-thiadiazole and its hydrogen maleate salt.

The S-3-X-4-[3-(Y-amino) - 2 - hydroxypropoxy]-1,2,5-thiadiazole compounds prepared by the process of this invention as well as their salts have been found to exhibit β-adrenergic blocking properties and are thus useful in the management of angina pectoris. Because of this property the optically active products are useful for the control of tachycardia that may be drug induced (as by isoproterenol) or brought about by physiological conditions.

The optically active products particularly in the form of their salts can be prepared in pharmaceutical formulations suitable for oral or parenteral administration and also can be combined with other active ingredients for simultaneous administration. No special problems are involved in preparing suitable formulations of the optically active compounds or salts thereof and methods generally employed for this purpose, which are known to those skilled in this art, are entirely suitable. Dosage units of from about 2 mgs. to about 10 mgs. can be provided for the symptomatic adjustment of dosage of the optically active substances by the physician depending upon the age and condition of the patient.

Illustrative examples of suitable pharmaceutical compositions containing S(—) - 3-morpholino-4-(3-tert-butylamino - 2 - hydroxypropoxy)-1,2,5-thiadiazole hydrogen maleate as active ingredient follow. Each of the compositions are prepared by conventional methods, and the quantities recited are for each unit dosage. The other optically active products prepared as hereinbefore described can be similarly formulated.

Injectable solution: Mg.
    Active compound ........................ 1
    Sodium chloride ......................... 9
    Distilled water, q.s. 1.0 ml.
Capsules:
    Active compound ........................ 5
    Magnesium stearate ..................... 2.0
    Lactose U.S.P. ........................ 19.3

What is claimed is:

1. A process comprising the reaction of 3,4-dichloro-1,2,5-thiadiazole with morpholine, piperidine, hydroxypiperidine and N-lower alkylpiperazine to provide a 3-X-4-chloro-1,2,5-thiadiazole wherein X is morpholino, piperidino, hydroxypiperidino or N-lower alkyl-1-piperazinyl.

2. A process as claimed in claim 1 wherein the reaction is carried out at a temperature between about 80° C. to about 150° C.

3. A process as claimed in claim 1 wherein the 3,4-dichloro-1,2,5-thiadiazole is reacted with morpholine thus providing 3-morpholino-4-chloro-1,2,5-thiadiazole.

4. A thiadiazole having the structure

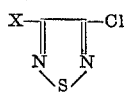

wherein X is morpholino, piperidino, hydroxypiperidino or N-lower alkyl-1-piperazinyl.

5. 3-morpholino-4-chloro-1,2,5-thiadiazole.

References Cited
UNITED STATES PATENTS 3,115,497    12/1963    Vest ............. 260—302 D
3,655,663    4/1972    Wasson ........... 260—247.1

OTHER REFERENCES

Lentin: Chemical Abstracts, pp. 12,009–12,010, vol. 61 (1964).

ALEX MAZEL, Primary Examiner

J. TOVAR, Assistant Examiner

U.S. Cl. X.R.

260—268 H, 293.68; 424—248